United States Patent
Dickson

[11] 3,767,310
[45] Oct. 23, 1973

[54] DIFFRACTION GRATING BEAM SPLITTER

[75] Inventor: LeRoy David Dickson, Rochester, Minn.

[73] Assignee: International Business Machines Corporation, Armonk, N.Y.

[22] Filed: June 23, 1972

[21] Appl. No.: 265,847

[52] U.S. Cl............. 356/218, 350/3.5, 350/162 R, 356/225, 356/256
[51] Int. Cl......................... G01j 1/42, G02b 27/00
[58] Field of Search.................. 356/218, 225, 226, 356/256; 350/3.5, 162 R

[56] References Cited
UNITED STATES PATENTS
3,611,181  10/1971  Lary et al......................... 350/162 R

*Primary Examiner*—David Schonberg
*Assistant Examiner*—V. P. McGraw
*Attorney*—Carl W. Laumann, Jr. et al.

[57] ABSTRACT

The optical system divides a beam of coherent radiation into a pair of beams having powers according to a desired ratio. The primary beam is intercepted by a holographic diffraction grating positioned at approximately the Bragg angle, placing virtually all the diffracted energy into the 0th and the selected one of either the +1st or −1st diffraction orders.

The ratio of the power of the 0th order to selected one of the +1st or −1st diffraction order is varied by changing the angle of the grating with respect to the primary beam. The ratio can be set by calibrating the angle of the grating in terms of the split ratio or by monitoring the power of the unselected one of the +1st or −1st diffraction order. The output signal from the power monitor in the unselected order can also be used to control the power of the primary beam.

10 Claims, 1 Drawing Figure

PATENTED OCT 23 1973 3,767,310
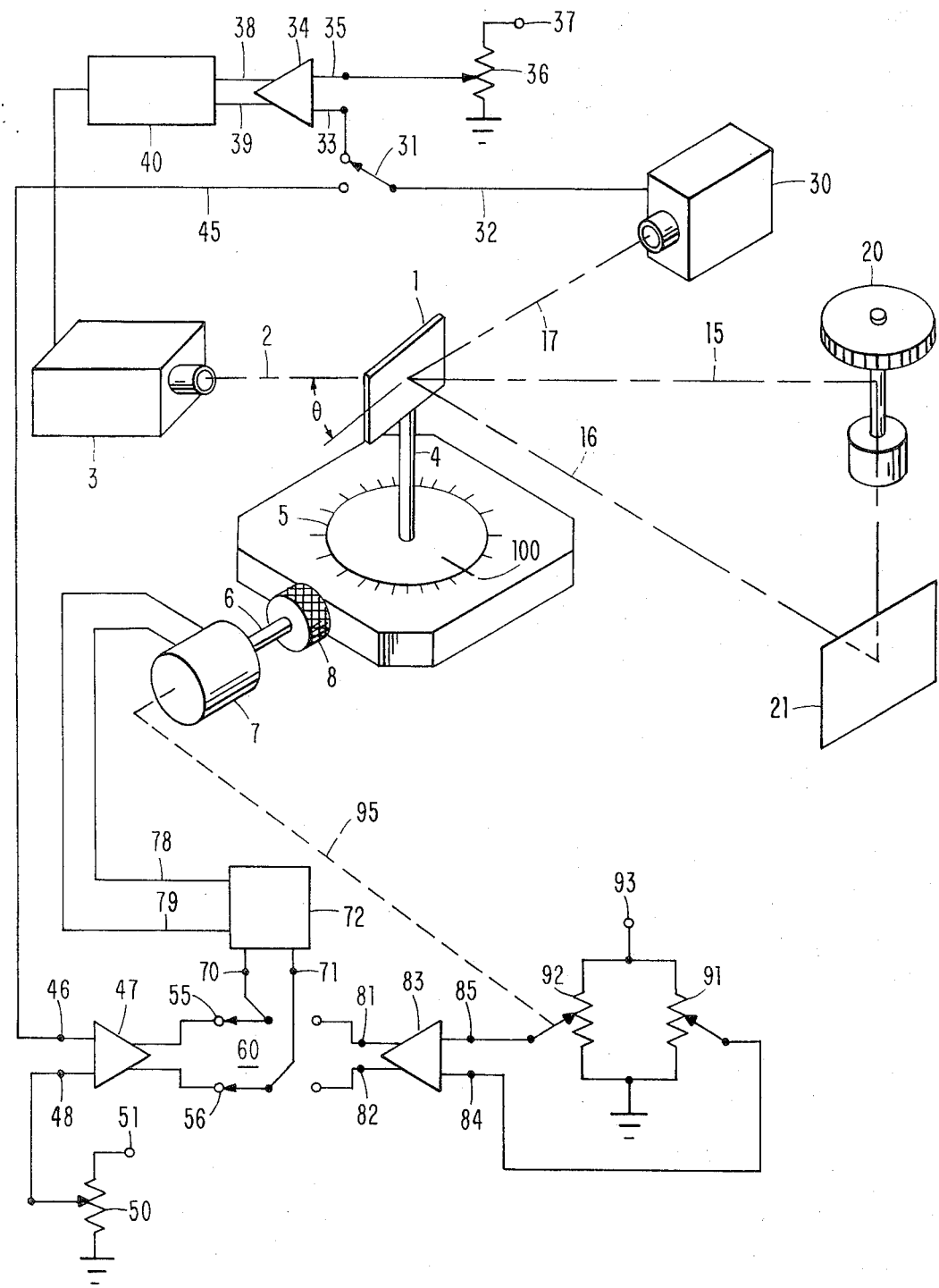

DIFFRACTION GRATING BEAM SPLITTER

BACKGROUND OF THE INVENTION

DESCRIPTION OF THE PRIOR ART

For the generation of holograms having optimum characteristics it is essential to control the ratio of the power of the light from the object to the power of the light in the reference beam. Traditionally this has been accomplished by a reflective type of variable ratio beam splitter. Typical of such beam splitters is a device having a metallic film deposited on a glass plate. The thickness of the film, and therefore the reflectivity, varies over the surface of the plate. When the plate is circular in form and mounted for rotation so that areas of various reflectivities can be introduced into the beam, it is possible to obtain the desired ratios between the transmitted and the reflected beam.

This arrangement is fully acceptable in certain situations, but is does not have disadvantages which make it less than ideal. For example, the ratio of transmitted to reflected light is dependent upon the plane of polarization of the light coming from the laser source. This is particularly true when the splitter is arranged so that the amount of reflected light is low. In this case, the splitter acts like a dielectric instead of a metal and the ratio of reflected to transmitted power will be depedent upon angle of incidence, refractive index of the dielectric and polarization of the incident light, according to Fresnel's Laws of Reflection.

The use of this type of beam splitter usually results in an angle of 90° or more between the transmitted and the reflected beam. This is undesirable in the situation where space limitations prohibit folding of optical paths for path length equalization.

In addition to those shortcomings, the reflective splitter suffers from the characteristic that the total light which is contained in the two resulting beams will vary as the split ratio changes. The minimum total energy in the two resulting beam occurs when the split ratio is 1:1 because the scattering and absorption of energy by the metallic film is the maximum at this point. Approximately one half of the beam power is lost when the split ratio is 1:1. The loss of power is not a real problem, however, the amount of power which is lost can vary considerably as the split ratio is changed.

Because the power in the two resulting beams is a variable quantity, it is necessary to measure the power in a beam after a change in the split ratio is made. Without such a measurement, the correct exposure time can only be estimated, since the amount of energy in the two beams is unknown.

With this type of beam splitter, it is difficult to continuously monitor the laser output without obstructing the primary beam or the two resulting beams. Where the width of the beam exceeds that required for the particular use, the excess width of the beam can be intercepted for monitoring purposes. Systems with a constant beam power generally include means for monitoring the beam so that variations in laser output may be corrected by changing the input power to the laser. Placing a monitor in the periphery of the beam is usually a cumbersome solution. Each time the beam is altered, the monitor must be repositioned and calibrated once again.

SUMMARY OF THE INVENTION

A holographic Bragg phase diffraction grating is used as the beam splitting element. The grating may be fabricated in accordance with the technique described in *Applied Optics*, Vol. 9, No. 7, July 1970, p. 1943. The grating is positioned on a rotatable mount in a location to intercept the primary beam at an angle which approximates the Bragg angle. Approximately 50 percent of the primary beam is absorbed or scattered. For angles close to the Bragg angle, 50 percent of the power of the primary beam is transmitted into the 0th and +1st diffraction order. A small amount, 0.02 percent, appears in the −1st diffraction order.

As the grating is rotated to a new angle, the total power in the +1st and 0th orders remains essentially constant; however, the ratio of the power in the +1st order to that in the 0th order changes. A small, but measurable, change of the power in the −1st order allows the split ratio between the 0th and +1st orders to be indirectly monitored.

The output of the monitor can be used to determine the proper grating angle for a desired split ratio without the need for measurements of the 0th an +1st diffraction orders. The output of the monitor can be used to regulate the laser power to a constant value once the grating is at the proper angle.

It is therefore an object of this invention to provide an improved beam splitter for coherent radiation.

It is a further object of this invention to provide a beam splitter which provides a variable ratio while holding the total power in the resulting beams at an essentially constant value.

It is a further object of this invention to provide a beam splitter which allows indirect monitoring and regulation of beam power in the primary beams.

Still another object of this invention is to provide a beam splitter which is relatively insensitive to the plane of polarization of the incident beam.

Still another object of this invention is to provide a beam splitter in which the emergent beams are separated by an angle less than 90°.

The foregoing and other objects, features and advantages of the invention will be apparent from the following more particular description of preferred embodiments of the invention as illustrated in the accompanying drawing.

DESCRIPTION

A diffraction grating 1 is positioned to intercept the output beam 2 from laser 3. Grating 1 is mounted on a rotatable shaft 4 so that the angle $\theta$, which is the angle between the incident beam 2 and grating 1, may be varied. Shaft 4 is affixed to the center of rotary table 5. A drive shaft 6 allows table 5 to be driven in either a clockwise or counterclockwise direction by motor 7. The rotary table 5 may be of the general type sold by the J. A. Noll Co., Monroeville, Pa.

When it is positioned as shown, grating 1 will be effective to divide the incident primary beam 2 into three beams, the 0th order 15, the +1st diffraction order 16 and the −1st diffraction order 17. Grating 1 will absorb some of the power of the incident beam and scattering will cause further power to be diverted from resulting beams 16, 17 and 18. When grating 1 is fabricated according to the fashion described in the *Applied Optics* article and operated near the Bragg angle, approximately 50 percent of the power is absorbed or scattered by the grating. A minute but measurable portion is diffracted into the −1st diffraction order. The remainder, which is approximately 50 percent of the power of the incident beam, is diffracted into the 0th and +1st diffraction orders.

An object 20 is positioned in the path of the 0th order. A recording plate 21 is positioned in the path of the +1st order. Although beam expanding lenses are not shown, it will be appreciated that such components may be added to the system where the nature and size of the object 20 requires it. Some of the light diffracted by object 20 reaches plate 21 to form an interference pattern with the +1st order beam. This arrangement is capable of producing a hologram on plate 21 provided that the ratio of the intensity in the +1st order beam, at plate 21, to the intensity in the diffracted beam from object 20, at plate 21, is properly set. For optimum holograms, this ratio is set to approximately 4:1. That is, the intensity in the reference beam at plate 21 (+1st order 16) is four times the intensity in the beam diffracted by object 20, at plate 21. The desired split ratio can be set by rotating grating 1 to vary the angle between the incident beam 2 and the grating.

Grating 1 is a holographic Bragg phase grating. The preferred device is a high efficiency phase diffraction grating constructed according to the bleached hologram process described on page 48, in *Principles of Holography*, H. M. Smith, 1969, Wiley & Sons. The grating is constructed in a large angle, 10° or more, interferometric system.

A grating of this type exhibits the characteristic that only a single diffraction order (−1st) is produced when the grating is illuminated by a beam of coherent light. The amount of light diffracted into the +1st order is determined by the angle $\theta$ at which the incident beam strikes the grating. When the angle $\theta$ is equal to the Bragg angle, the power in the +1st order beam is a maximum. As the grating is rotated away from the Bragg angle, the power of the +1st order beam decreases and the power in the 0th order beam increases, but the sum of the power in the two beams remains essentially constant.

There is a small amount of power diffracted into the −1st order. The actual amount is dependent on the angle $\theta$. The value is a minimum at the Bragg angle, typically 1/1,000 of the sum of the power in the 0th and +1st order beams. As the grating is rotated to increase the angle $\theta$, there is less power diffracted into the +1st order and more power in the 0th order. The power in the −1st order bears a definite relationship to the angle $\theta$ and therefore also the split ratio between the +1st order and the 0th order.

From the chart below, it can be seen that the power in the −1st order rises quite rapidly as the angle is increased from the Bragg angle. The value peaks at a split ratio of approximately 5, although the angle at which this peak value occurs will vary somewhat depending on the actual Bragg angle and the emulsion thickness of the film. Further increase in the angle $\theta$ results in a decrease in the amount of power in the −1st order.

| Angle $\theta-\theta_b$ | Split Ratio $I_0/I_{+1}$ | Power $I_0$ (mw) | Power $I_{+1}$ (mw) | Power $I_0+I_{+1}$ (mw) | Power $I_{-1}$ ($\mu$w) |
|---|---|---|---|---|---|
| 0° | 1.40 | 4.5 | 3.2 | 7.7 | 3 |
| 1° | 1.42 | 4.4 | 3.1 | 7.5 | 5 |
| 2° | 1.47 | 4.4 | 3.0 | 7.4 | 7 |
| 3° | 1.81 | 4.7 | 2.6 | 7.3 | 14 |
| 4° | 2.48 | 5.2 | 2.1 | 7.3 | 26 |
| 5° | 3.80 | 5.7 | 1.5 | 7.2 | 45 |
| 6° | 6.30 | 6.3 | 1.0 | 7.3 | 57 |
| 7° | 12.40 | 6.8 | 0.55 | 7.35 | 54 |
| 8° | 33.30 | 7.0 | 0.21 | 7.21 | 32 |

Since there are two split ratios for most values of power in the −1st order, it is not possible to determine which of the two split ratios exists by measuring the power in the −1st order alone. In actual practice, this is not a problem because holography generally requires the higher range of split ratios, 5:1 and upward, to the exclusion of the low ratios. In interferometry, the general, requirement is for lower split ratios, for example 1:1 through 5:1. Depending on the type of work being done, one range or the other can be selected. Mechanical stops can be put on the table 5 to limit the movement to the device range.

Referring again to the drawing, a sensitive monitor such as light meter 30 such as the LITE MIKE manufactured by E. G. & G., Inc. (Edgerton, Germeshausen & Grier) is positioned to monitor the power in the −1st order beam. In the event that it is desired to hold the output power of the laser 3 at a constant predetermined value, switch 31 is positioned to supply the output signal on from monitor 30 on line 32 to the input 33 of comparator amplifier 34. Input 35 is energized from potentiometer 36 which has a constant reference voltage applied to terminal 37. An output signal from comparator amplifier 34, on line 38 indicates that the signal on line 35 is greater than the signal on line 33. An output signal on line 39 indicates that the signal on line 33 is greater than the signal on line 35. The output signals on lines 38 and 39 therefore represents the result of the comparison between the actual power level detected by monitor 30 and the desired power level as established by the setting of potentiometer 36. The output signals from comparator amplifier 38 are applied to the power supply 40 for the laser 3.

Power supply 40 responds to the signal on line 38 by decreasing its output power to reduce the output power of laser 3 to a point where the signal on lines 33 and 35 are equal. A signal on line 39 causes an increase in the output power of laser 3. By properly adjusting the gain and feedback values of th various stages in comparator amplifier 34 and power supply 40, it is possible to hold the power level in the +1st and 0th orders to a constant level without monitoring these orders directly.

While the drawing shows control of the laser output power as the means for regulating to power in the selected order, it is possible to use an unregulated laser and achieve control by means of a modulator in the primary beam 2.

The ability to monitor the split ratio can be utilized as a convenient means for automatically setting the split ratio from a remote position. When this mode of operation is desired, switch 31 is set to the alternative position to connect the monitor output signal on line 32 to line 47. The other input terminal 46 of comparator amplifier 47. The other input terminal 48 is connected to split ratio potentiometer 50 which is energized from a voltage reference source connected to terminal 51.

Comparator amplifier 47 has a pair of output terminals 55 and 56. An output signal at terminal 55 indicates that the signal at terminal 46, from the power monitor 30, is greater than the signal at terminal 48 from the split ratio potentiometer 50. Similarly, an output signal at terminal 56 indicates that the signal at terminal 48 is greater than the input signal at terminal 46. There is a dead-band where the signals at terminals 46 and 48 are very nearly equal and no signal exists at either output terminals 55 or terminal 56.

The selector switch 60 is shown in the position where it connects the signals on terminals 55 and 56 to the input terminals 70 and 71 of motor drive amplifier 72. A pair of leads 78 and 79 connect the output of motor drive amplifier 72 to motor 7. In the embodiment shown, motor 7 is a d.c. motor which can be driven in either direction depending on the polarity of the voltage applied across leads 78 and 79.

An input signal at terminal 70 indicates that the power level in the −1st order is greater than the reference signal from potentiometer 50. In this case, motor drive amplifier 72 will generate an appropriate voltage across leads 78 and 79 to cause motor 7 to rotate in the direction which will change the angle of grating 1 to reduce the magnitude of the power in the −1st order. If the system is operating in the region where the split ration varies from 1.4:1 to 5:1. the grating 1 will be rotated to reduce the angle, thereby placing more power in the +1st order and less power in the 0th and −1st orders. Rotation of grating 1 would be in the clockwise direction until the power in the −1st order decreases to the point where the signal at terminal 46 is equal to the signal at terminal 48.

When operating in this mode, the output power of the laser 3 must be held constant since variations in laser output would be interpreted as changes in the reference signal from potentiometer 50. The usual mode of operation would be to use this mode only for the short period of time required to change the position of grating 1 to a new angle. The normal sequence would be to set the potentiometer 50 to a position which indicated the desired split ratio. Switch 31 would then be operated to connect the output signal on line 32 to line 45. Switch 60 would then be moved to the position shown in the drawing and motor 7 would begin operation. When motion of the grating to the new position was complete, switch 60 would be moved to disconnect the inputs to motor drive amplifier 72. Switch 31 would very likely be changed back to the position shown so as to again regulate the output power of laser 3.

Since the relationship between the power in the 0th order and the +1st order is also dependent on the angle that the grating presents to beam 2, it is possible to adjust the split ratio from a remote location by using the angular position as a feedback signal. To operate in this mode, switch 60 is positioned so that the input terminals 70 and 71 of motor drive amplifier 72 are connected to the output terminals 81 and 82 of amplifier 83. Input terminals 84 and 85 are connected to be energized by the signals from potentiometers 91 and 92, which are both energized from a reference voltage source connected to terminal 93.

In this mode of operation, the slider on potentiometer 91 is set to the point on a dial scale which indicates the desired split ratio. This scale can be derived by a calibration procedure in conventional fashion. When the output voltage from potentiometer 91, applied to input terminal 85, is not equal to the voltage applied to input terminal 86 from potentiometer 92, a signal will appear at output terminal 81 or 82 depending on the relative magnitudes of the input signals. An output signal from comparator amplifier 83 will cause motor drive amplifier 72 to energize leads 78 and 79 with an appropriate polarity voltage to drive motor 7 in the correct direction. When motor 7 rotates shaft 6, a mechanical connection represented by dashed line 95 causes the tap on potentiometer 92 to move in the direction which makes the output voltage from potentiometer 92 more nearly equal to the input voltage from potentiometer 91. Motor 7 continues to drive the shaft 6, thereby rotating grating 1, until the output signal from potentiometer 92 is equal to the output signal from potentiometer 91. At this point, the two input signals to comparator amplifier 83 are equal and the output signal at terminal 81 or 82 disappears. With no signal at either input terminal 70 or 71, motor drive amplifier 72 ceases to supply a voltage across leads 78 and 79 and motor 7 stops rotation.

This system is not sensitive to the plane of polarization of beam 2. There is no need to control or set the plane of polarization when using this beam splitter.

Calibration of the system for the various modes of operation can be easily accomplished. Suitable scales would be affixed to the sliders associated with potentiometers 36, 50 and 91. The scale on potentiometer 36 would be calibrated in units of output power. Potentiometer 50 would bear a scale calibrated in spilt ratio, as would potentiometer 91.

Potentiometer 36 can be calibrated in units of output power for each desired split ratio or those which are most commonly used. To do this, the grating would be set to provide a given split ratio. A second power monitor would be placed in the path of beam 15 or 16. With switch 31 in the position shown in the drawing, the reading of the second power monitor would be recorded on the scale associated with potentiometer 36. A new position for the slider on potentiometer 36 would be selected and the power indicated by the second power monitor would be recorded on the scale. These steps or their equivalent, would be repeated until calibration is complete.

Calibration of potentiometer 50 requires that the power in the 0th and the +1st order be measured. This measurement could be performed by a single power monitor which would be placed first in the path of beam 15 and then in the path of beam 16. In the alternative, monitors could be placed in the path of each beam. Potentiometer 50 would be calibrated with switch 30 in the position connecting the signal on line 32 to the input terminal 46 of comparator amplifier 47. Switch 60 would be in the position shown in the drawing.

For each position of the slider on potentiometer 50, a reading of the power in beams 15 and 16 would be made. From these readings, the split ratio would be calculated and entered on the scale associated with potentiometer 50.

While the drawing is illustrative of a system in which the beam splitter is automatically set in response to the signal from potentiometer 50, it is also possible to set the beam splitter manually by means of the knurled knob 8 on shaft 6. In such a system, th meter on monitor 30 would be calibrated by split ratio. This calibration would proceed with switch 60 in the intermediate position so that no signal is applied to input terminals 70 and 71. The control of power supply 40 is shifted from the output of comparator amplifier 34 to an interval control which is independent of the value sensed by monitor 30.

Power monitors would be placed in the path of beams 15 and 16. The knurled knob 8 would be used to move grating 1. For each discrete position of grating 1, the power in beams 15 and 16 would be recorded. From these figures, the split beam ratio can be calculated and entered on the scale of the meter associated with monitor 30.

The calibration of potentiometer 91 would resemble calibration of the meter associated with monitor 30. The control of power supply 40 is shifted from the output of comparator amplifier 34 to an internal control which is independent of the vlaue sensed by monitor 30. Switch 60 is in the position connecting output terminals 81 and 82 of comparator amplifier 83 to input terminals 70 and 71 of motor drive amplifier 72. Power monitors would be placed in beams 15 and 16.

The slider on potentiometer 91 would be set to an initial position and the servo system which includes comparator amplifier 83, motor drive amplifier 72, motor 7 and feedback potentiometer 92 is allowed to settle. The power in beams 15 and 16 is read from the power monitors and the split ratio is calculated. This split ratio is then entered on the scale associated with potentiometer 91. The same split ratio can also be entered on scale 100 on the positioning device for grating 1.

The calibration would be performed for a sufficient number of positions of potentiometer 91 to provide the amount of scale resolution appropriate for the application.

In the case where the rotary table 5 has a scale calibrated in degrees, it may be convenient to prepare a calibration table which indicates the split ratio for given angular positions. Such a table would resemble the foregoing compilation of data with as many additional entries as are required to provide the needed resolution.

The device exhibits a sensitivity to grating emulsion thickness and the Bragg angle. For gratings with large Bragg angles or thick emulsions, there is a greater sensitivity to angular rotation so that a large range of split ratios can be obtained with small rotation. This may be desirable to reduce the rotational shift of the +1st order. While not objectionable in most cases, the example shown rotated the +1st order 1° for a 5° rotation of the grating. A 2.5° rotation, from 5.5° to 8°, provided a range of split ratios from 5:1 to 33:1. A 5° rotation, from 0°–5°, provided a range of split ratios from 1.4:1 to 5:1.

In this description, data is provided for angular excursions starting with the Bragg angle and extending to greater angles up to 8°. The same effect has been observed for excursions in the opposite direction, that is, at angles less than the Bragg angle.

While temporal coherance (monochromaticity) is not absolutely necessary, the system is wavelength sensitive and would exhibit some color spreading.

This slight change in the angle of the +1st order is not objectionable in most cases and could be overcome by using an FM grating where a rotational change also served to alter the grating frequency.

While the invention has been particularly shown and described with reference to preferred embodiments thereof, it will be understood by those skilled in the art that the foregoing and other changes in form and details may be made therein without departing from the spirit and scope of the invention.

What is claimed is:

1. Means for dividing a primary beam of coherent radiation into a pair of beams having power according to a predetermined ratio, said means comprising:

a diffraction grating positioned to intercept said primary beam at an angle to place essentially all the energy affected by said grating into the 0th and the selected one of the +1st or −1st diffraction orders, and power monitoring means positioned to intercept the resulting beam in the unselected one of said +1st or −1st diffraction orders to provide an output signal representing the relative powers of the beams in the 0th and selected one of said +1st or −1st diffraction orders.

2. A means according to claim 1 wherein said diffraction grating is a holographic phase diffraction grating.

3. A means according to claim 2 wherein the angle is approximately the Bragg angle.

4. Means for dividing a beam of coherent radiation into a pair of beams having powers controlled according to a predetermined ratio, said means comprising:

a diffraction grating positioned to intercept said beam at an angle to place essentially all the energy affected by said grating into the 0th and the selected one of the +1st and the −1st diffraction orders, monitoring means positioned to intercept the resulting beam in the unselected one of said +1st or −1st diffraction orders to provide an output signal representing the power to said resulting beam, and positioning means responsive to said output signal for rotating the said diffraction grating to set the power of said unselected beam to a desired value whereby the power ratio of the 0th to the one other of said +1st and −1st diffraction orders is set to a desired value.

5. In a system for dividing a beam of coherent radiation into a pair of beams having a desired power ratio, the combination comprising:

a holographic Bragg phase diffraction grating positioned to intercept said beam at approximately the Bragg angle to place essentially all the non-absorbed energy affected by said grating into the 0th and the selected one of the +1st and −1st diffraction orders, means for rotating said grating to vary the angle at which the beam is incident on the grating, indicating means, coupled to said rotating means for representing the angular position of said grating, said indicating means having a scale calibrated according to the ratio of power of the 0th and the selected one of the +1st and −1st diffraction orders.

6. The method of calibrating a holographic Bragg phase diffraction grating in terms of the split ratios of power between the 0th diffraction order and the selected one of the +1st or −1st diffraction orders comprising the steps of:

1. positioning said grating to intercept a beam of coherent radiation at approximately the Bragg angle,
2. measuring and recording the power of the 0th order beam,
3. measuring and recording the power of the selected one of the +1st or −1st diffraction order,
4. calculating the split ratio of the power levels recorded in the steps 2 and 3,
5. measuring and recording the angle of said grating to the incident beam,
6. repositioning the gratings to a slightly different angle and repeating steps 2–5 to develop a table of split ratios for grating angles in the range of the Bragg angle.

7. The method of calibrating a holographic Bragg phase diffraction grating in terms of the power of the unselected one of the +1st or −1st diffraction order and its relationship to the split ratio between the 0th diffraction order and the selected one of the +1st or −1st diffraction orders comprising the steps of:
1. positioning said grating to intercept a beam of coherent radiation at approximately the Bragg angle,
2. measuring and recording the power of the 0th order beam,
3. measuring and recording the power of the +1st order beam,
4. measuring and recording the power of the −1st order beam,
5. repositioning the grating to a slightly different angle and repeating steps 2, 3 and 4,
6. repeating the preceding steps to provide sufficient measurements to calibrate the split ratio between the 0th order and the selected one of the +1st or −1st order in terms of the power of the unselected one of the +1st or the −1st order.

8. In an optical system for dividing a primary beam of coherent radiation into a pair of beams, means for holding the power of said primary beam to a constant value comprising:
a diffraction grating positioned to intercept said primary beam at an angle to place essentially all the energy affected by the grating into the 0th and the selected one of the +1st and −1st diffraction orders,
monitoring means positioned to intercept the resulting beam in the unselected one of said +1st or −1st diffraction orders to provide an output signal representing the power of said beam,
output power control means for varying the power of said primary beam in response to a signal applied to a control terminal,
means connecting said output signal from said monitoring means to said control terminal whereby a change in the power in said primary beam results in a change in the output signal from said monitoring means which is effective to restore the beam to the original power level through said control means.

9. A system according to claim 5 wherein said output power control means includes a power supply for the source of the primary beam.

10. A system according to claim 5 wherein said output power control means includes a modulator positioned to intercept said primary beam.

* * * * *